United States Patent
Rattan et al.

[15] 3,655,163
[45] Apr. 11, 1972

[54] ANTI-HUNTING DIAPHRAGM VALVE

[72] Inventors: William D. Rattan, Paramount; Harold A. McIntosh, South Pasadena, both of Calif.

[73] Assignee: Robertshaw Controls Company, Richmond, Va.

[22] Filed: May 12, 1970

[21] Appl. No.: 36,656

[52] U.S. Cl. ................................ 251/45, 251/30, 251/331
[51] Int. Cl. .................................................. F16k 25/00
[58] Field of Search ...................... 251/45, 30, 331, 75

[56] References Cited

UNITED STATES PATENTS

| | | | |
|---|---|---|---|
| 3,468,511 | 9/1969 | Haskins | 251/333 X |
| 3,362,679 | 1/1968 | Le Wan | 251/30 X |
| 1,986,475 | 1/1935 | Hewitt | 251/331 X |
| 3,307,633 | 3/1967 | Newell | 251/175 X |

*Primary Examiner*—Arnold Rosenthal
*Attorney*—Auzville Jackson, Jr., Robert L. Marben and Anthony A. O'Brien

[57] ABSTRACT

An anti-hunting, pilot controlled, diaphragm valve including a diaphragm disposed in a casing to define a chamber therewith, a valve face carried by the diaphragm and disposed adjacent a valve seat in the casing to control flow between an inlet and an outlet in the casing, bleed holes in the diaphragm to provide communication between the inlet and the chamber, a central passageway through the valve face to provide communication between the outlet and the chamber, a pilot valve member cooperating with the passageway to control flow therethrough, and a flexible skirt on the valve face defining a space therein subjected to outlet pressure and having an outer surface subjected to outlet pressure such that the skirt flexes inward with increased inlet to outlet pressure differentials.

11 Claims, 3 Drawing Figures

Patented April 11, 1972 3,655,163

INVENTORS,
William D. Rattan
Harold A. McIntosh
BY Anthony A. O'Brien
ATTORNEY

ANTI-HUNTING DIAPHRAGM VALVE

BACKGROUND OF THE INVENTION

1. Field of the Invention

The present invention pertains to diaphragm valves and more particularly to anti-hunting, pilot controlled diaphragm valves.

2. Description of the Prior Art

Conventional pilot controlled, diaphragm valves have a first side carrying a valve face cooperating with a main valve seat to control flow between an inlet and an outlet of a casing. A central passageway extends through the valve face and communicates with a chamber formed between the casing and a second side of the diaphragm, and a pilot valve member is adapted to cooperate with the central passageway. The chamber communicates with the output through the central passageway and with the inlet through bleed holes in a peripheral web of the diaphragm.

When it is desired to close the diaphragm valve, the pilot valve member is moved against the central passageway to prevent flow therethrough; and, accordingly, pressure in the chamber will increase to the inlet pressure and force the valve face against the valve seat to close the diaphragm valve. In order to open the diaphragm valve, the pilot valve member is moved away from the central passageway to exhaust the pressure in the chamber and permit the inlet pressure to force the diaphragm away from the valve seat to open the diaphragm valve. The valve face will balance itself at a point of equilibrium between the pilot valve member and the valve seat to establish a predetermined flow. In modulating valves, the pilot valve member is selectively movable to, accordingly, vary the balanced position of the valve face and the flow through the casing.

One disadvantage concomitant with conventional pilot controlled, diaphragm valves is that a hunting or chatter condition occurs when the valve face is positioned near the valve seat to provide low flow. During such a low flow condition, a high inlet to outlet pressure differential is developed across the diaphragm which tends to close the diaphragm valve. When the diaphragm valve closes in response to the high pressure differential, the first side of the diaphragm is momentarily subjected to full inlet pressure while the second side of the diaphragm will not be subjected to the full inlet pressure because the bleed holes have a time delay associated therewith and cannot quickly supply an equal pressure to the chamber on the second side of the diaphragm. Thus, the valve face is forced away from the valve seat to open the diaphragm valve; and, if pressure conditions are such as to perpetuate this situation, rapid opening and closing will result in the development of a resonant oscillation which is referred to as hunting or chatter.

SUMMARY OF THE INVENTION

Accordingly, it is an object of the present invention to construct a diaphragm valve that is not subject to hunting during low flow conditions.

The present invention is generally summarized in an anti-hunting diaphragm valve including a casing having an inlet, an outlet and a valve seat disposed therebetween, a flexible diaphragm defining a chamber with the casing, and a valve face carried by the diaphragm and including an inner portion and a flexible peripheral edge defining a space therebetween, the peripheral edge cooperating with the valve seat to control flow through the casing and being disposed such that the space is subjected to outlet pressure and an outer surface thereof is subjected to inlet pressure whereby the peripheral edge flexes inward in response to increased inlet to outlet pressure differentials.

Another object of the present invention is to construct a diaphragm with a flexible skirt acting as a valve element such that the skirt flexes with increased inlet to outlet pressure differentials.

A further object of the present invention is to utilize a valve face having a space therein subjected to outlet pressure to prevent hunting in a pilot controlled, diaphragm valve.

Some of the advantages of the present invention over the prior art are that various flow conditions may be accurately provided without hunting to permit accurate flow modulation, that on-off operation may be provided without adverse effects on the diaphragm valve, and that pressure differential gradients with the diaphragm movement are reduced.

Further objects and advantages of the present invention will become apparent from the following description of the preferred embodiments taken in conjunction with the accompanying drawing.

DESCRIPTION OF THE PREFERRED EMBODIMENTS

Figure 1:
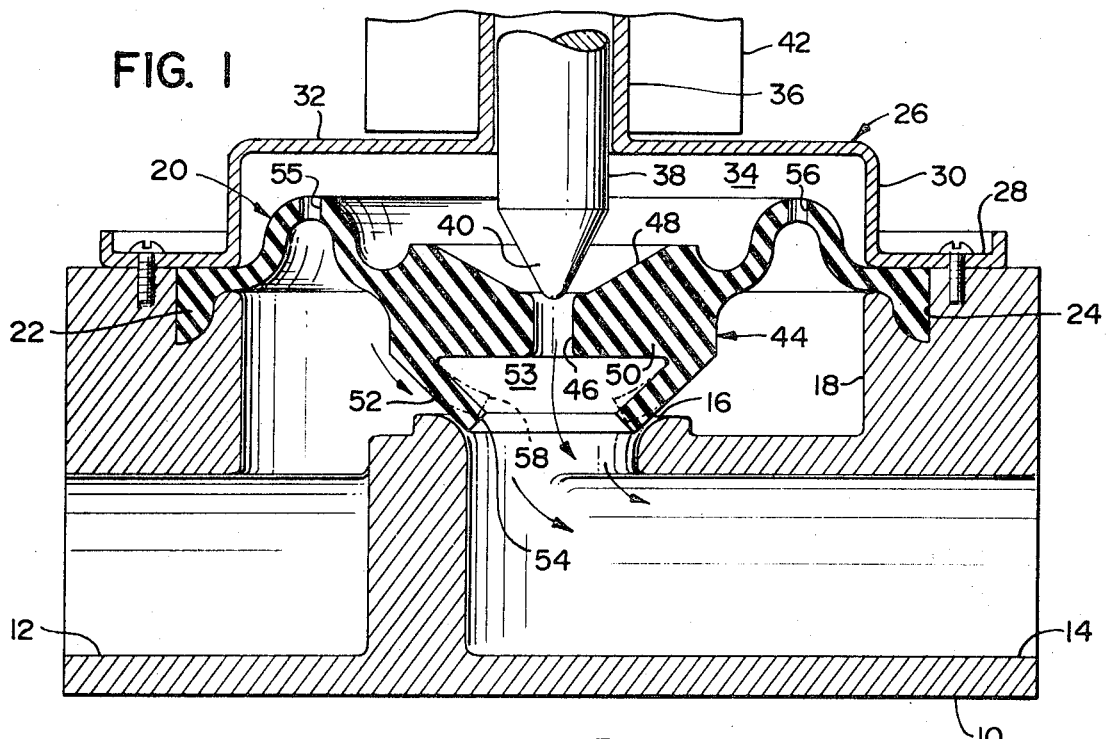
FIG. 1 is an elevational view partially in section of an anti-hunting diaphragm valve according to the present invention.

An anti-hunting, pilot controlled, diaphragm valve according to the present invention is illustrated in FIG. 1 and is disposed in a casing 10 having an inlet 12 communicating with an outlet 14 through an annular valve seat 16. Casing 10 is hollowed to form an inlet chamber 18 in communication with inlet 12, and a diaphragm 20 has a web disposed across inlet chamber 18 terminating in a peripheral bead 22 which is compressed in an annular groove 24 in casing 10.

A cup-shaped plate 26 has an annular flange 28 secured to the upper surface of casing 10 by bolts to capture bead 22 of diaphragm 20 and form a seal therewith. An upstanding wall 30 extends from flange 28 to an annular top wall 32 that defines a chamber 34 above diaphragm 20. A guide cylinder 36 extends transversely from the center of top wall 32 and houses a pilot valve member 38 having a cylindrical portion slidably disposed in the guide cylinder 36 and a tapered head 40 centrally disposed above diaphragm 20. Pilot valve member 38 may be controlled by any suitable positioning means, generally indicated at 42, such as a solenoid for on-off operation or a bimetal or other condition responsive device for modulating operation.

Diaphragm 20 is constructed of a flexible material impermeable to gas and is formed with an enlarged valve face 44 at the center thereof having a central passageway 46 therethrough. Valve face 44 is formed with a concave portion 48 in the top thereof, an inner portion 50 and a flexible, conical, peripheral edge or skirt 52 extending therefrom to define a space 53 within the valve face. Skirt 52 is aligned with valve seat 16 to act as a valve element therefor to control flow through casing 10, and an aperture 54 in the bottom of skirt 52 permits space 53 to be subjected to outlet pressure. A pair of diametrically disposed bleed holes 55 and 56 are provided in the relatively thin web of diaphragm 20 which interconnects bead 22 with valve face 44.

In operation, pilot valve member 38 is utilized to control the open and closed conditions of the diaphragm valve in the same manner as conventional pilot controlled, diaphragm valves. That is, by moving valve member 38 to a position such that tapered head 40 seats at the mouth of central passageway 46 to prevent flow therethrough, the pressure in chamber 34 will increase to inlet pressure through bleed holes 55 and 56; and, since the force on the top side of diaphragm 20 will be greater than the force on the bottom side of the diaphragm, skirt 52 of valve face 44 will be forced against valve seat 16 to close the diaphragm valve.

In order to open the diaphragm valve, pilot valve member 38 is moved up to an operating position as illustrated in FIG. 1 by positioning means 42. When tapered head 40 is moved away from central passageway 46, the pressure in chamber 34 is exhausted to outlet 14 through central passageway 46; and, since the bottom side of diaphragm 20 will still be subjected to inlet pressure, diaphragm 20 will be forced up to move skirt 52 of valve face 44 away from valve seat 16 to open the diaphragm valve. Valve face 44 will seek an equilibrium position in accordance with the position of pilot valve member 38 such that the force on either side of diaphragm 20 is balanced. The equilibrium position of valve face 44 is, of course, controlled by the position of pilot valve member 38, and flow through casing 10 may accordingly be controlled by properly positioning pilot valve member 38.

In order to provide low flow through casing 10, pilot valve member 38 is moved down to a position such that skirt 52 of valve face 44 is near valve seat 16. Hunting or chatter is prevented when valve face 44 is in such a low flow condition due to the flexible nature of skirt 52 in that, space 53 is subjected to outlet pressure through aperture 54 such that skirt 52 has outlet pressure on the inner surface thereof and inlet pressure on the outer surface thereof. Thus, as the downward force on diaphragm 20 increases in response to increased inlet to outlet pressure differentials, skirt 52 will flex inward, as shown in phantom at 58, in response to the same pressure differential to permit increased flow through valve seat 16 and prevent hunting or chatter in the diaphragm valve operation.

Flexible skirt 52 also provides compensation for gradients of the inlet to outlet pressure differential caused by incremental movement of valve face 44. That is, when the diaphragm valve is wide open, outlet pressure is very nearly equal to inlet pressure; however, as the diaphragm valve closes, the difference between inlet and outlet pressure increases to a maximum pressure differential when skirt 52 of valve face 44 is very close to valve seat 16. For each increment of downward movement of valve face 44, the inlet to outlet pressure differential is not as drastically increased because the outlet pressure in space 53 within skirt 52 decreases, and skirt 52 flexes inwardly to allow a greater flow in response to the increased pressure differential. Therefore, each increment of downward movement of valve face 44 is not critical, and the diaphragm valve can accommodate low flow conditions without hunting or chatter.

Figure 2:
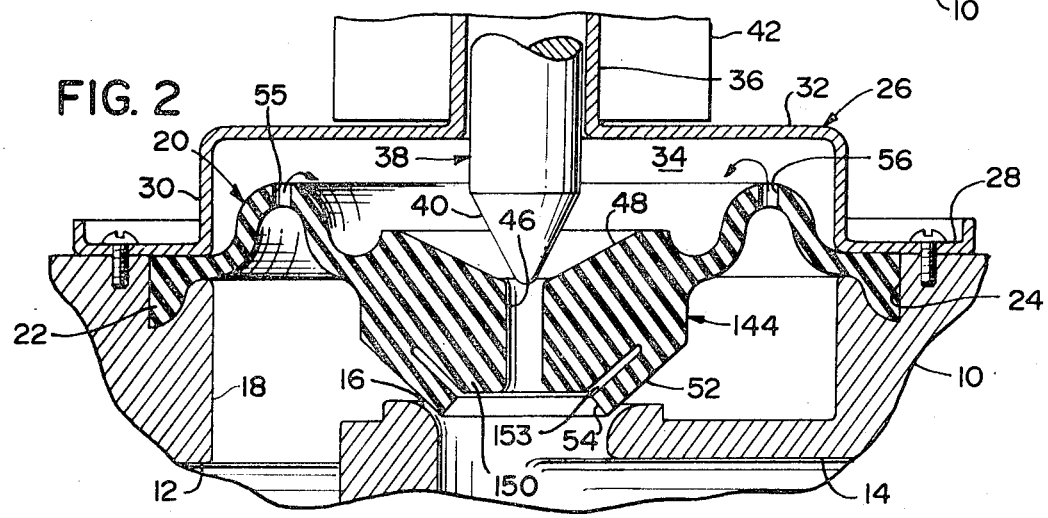
FIG. 2 is a broken elevational view partially in section of a modification of the anti-hunting diaphragm valve of FIG. 1.

Another embodiment of the present invention is illustrated in FIG. 2 and parts identical to parts in FIG. 1 are given identical reference numbers and are not described again. Parts in FIG. 2 which are similar to parts in FIG. 1 are given the same reference numbers with 100 added.

The basic difference between the embodiments of FIGS. 1 and 2 is that the valve face is formed with an inner cone-like portion 150 to limit the degree of localized oscillation or flexing of skirt 52. An annular space 153 is formed between inner portion 150, and skirt 52 and is subjected to outlet pressure through aperture 54. The thickness of skirt 52 and the width of annular space 153 influence the anti-hunting performance of the diaphragm valve under varying pressure differentials that may be encountered; and, accordingly, the thickness of skirt 52 and the width of annular space 153 are desirable designed for optimum performance for a particular application or range of applications.

In operation, skirt 52 acts in the same manner as previously described with respect to the embodiment of FIG. 1 to flex in response to increased inlet to outlet pressure differentials and prevent hunting or chatter during low flow conditions. Inner portion 150 acts as a stop to limit flexing of skirt 52 and further to prevent permanent deformation which could be caused by flexing skirt 52 beyond its elastic limit when the diaphragm valve is closed.

The inner cone-like portion 150 of valve face 44 is not required for valves which are not totally closed during normal operation, such as mixing valves; however, the inner cone-like portion is advantageous for valves which are frequently closed, such as zone control valves, single source water valves, and other valves subjected to high pressure differentials such that the diaphragm is subjected to the worse possible hunting or chatter conditions.

Figure 3:
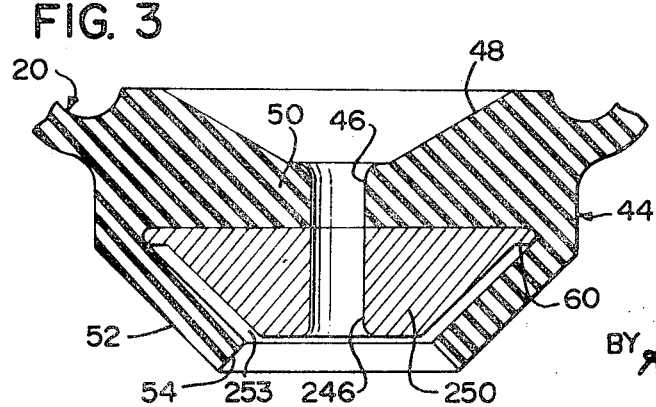
FIG. 3 is a broken section of a diaphragm for use with another modification of the anti-hunting diaphragm valve of FIG. 1.

The embodiment of FIG. 3 is a modification of the embodiment of FIG. 2 wherein the inner cone-like portion is not an integral part of the diaphragm. Parts in the embodiment of FIG. 3 which are identical to parts of the embodiment of FIG. 1 are given identical reference numbers and are not described again, and parts in FIG. 3 which are similar to parts in FIG. 1 are given the same reference numbers with 200 added.

The valve face 44 of FIG. 3 is substantially identical to the valve face illustrated in FIG. 1; however, an inner cone-like member 250 of rigid plastic is disposed within skirt 52 and has a peripheral lip 60 which engages the inner surface of the valve face to secure member 250 in place. A central passageway 246 extends through member 250 and is aligned with central passageway 46 to permit communication between chamber 34 and outlet 14 through the valve face. The space between the outer conical surface of member 250 and the inner surface of skirt 52 defines an annular space 253 which permits flexing of skirt 52 in the same manner as described with respect to the embodiment of FIG. 2. The thickness of skirt 52 and the width of space 253 may be varied depending upon the particular application of the diaphragm valve.

The operation of the embodiment of FIG. 3 is the same as the operation of the embodiment of FIG. 2 in that the outer surface of member 250 acts to limit deflection of skirt 52 to prevent deformation thereof.

Thus, it may be seen that by subjecting a flexible valve element to inlet to outlet pressure differentials in accordance with the present invention, hunting or chatter in valve operation during low flow conditions may be prevented while continuing to provide extremely accurate modulating characteristics. Furthermore, pressure differential gradients with diaphragm movements are reduced with valves according to the present invention to assure smooth operation.

Inasmuch as the present invention is subject to many variations, modifications and changes in detail, it is intended that all matter contained in the foregoing description or shown in the accompanying drawings shall be interpreted as illustrative and not in a limiting sense.

What is claimed is:

1. An anti-hunting diaphragm valve comprising
    casing means having inlet means, outlet means and a valve seat disposed therebetween;
    flexible diaphragm means secured in said casing means, and
    valve face means carried by said diaphragm means and including an inner portion of conical configuration and a flexible peripheral edge of conical configuration defining an annular space therebetween, said peripheral edge being disposed to cooperate with said valve seat to control flow through said casing means and to permit said space to be subjected to outlet pressure at said outlet means and said peripheral edge having an outer surface subjected to inlet pressure at said inlet means whereby said outer edge flexes inward in response to increased inlet to outlet pressure differentials.

2. The invention as recited in claim 1 wherein said peripheral edge has an aperture therein permitting communication between said space and said outlet means.

3. The invention as recited in claim 1 wherein said diaphragm means and said valve face means are integrally formed of a flexible material.

4. The invention as recited in claim 3 wherein said inner portion and said peripheral edge are integrally formed with said valve face means.

5. The invention as recited in claim 2 wherein said inner portion includes a rigid conical member secured in said valve face means.

6. The invention as recited in claim 1 wherein said diaphragm means has a first side defining a chamber with said casing means and a second side subjected to pressure at said inlet means, and further comprising bleed means communicating with said chamber and said inlet means.

7. The invention as recited in claim 6 wherein said valve face means has a central passageway therethrough communicating with said chamber and said outlet means.

8. The invention as recited in claim 7 wherein said bleed means includes diametrically disposed holes in said diaphragm means.

9. A pilot controlled, diaphragm valve comprising
casing means having inlet means, outlet means and a valve seat disposed therebetween;
flexible diaphragm means secured in said casing means and having a first side defining a chamber with said casing means;
bleed means communicating with said inlet means and said chamber;
valve face means carried by said diaphragm means and disposed adjacent said valve seat, said valve face means including a flexible skirt and an inner portion;
a passageway formed in said valve face means providing communication between said outlet means and said chamber;
a pilot valve member disposed in said casing means and cooperating with said passageway at said first side of said diaphragm to control flow therethrough;
said flexible skirt having a conical configuration and having an outer surface subjected to inlet pressure at said inlet means and an inner surface subjected to outlet pressure at said outlet means, said flexible skirt cooperating with said valve seat to control flow through said casing means whereby said flexible skirt deflects inward in response to increased inlet to outlet pressure differentials; and
said inner portion having a conical configuration and defining an annular space to limit deflection of said flexible skirt.

10. The invention as recited in claim 9 wherein said inner portion is a rigid cone-like member.

11. The invention as recited in claim 9 wherein said diaphragm means and said valve face means are integrally formed of flexible material.

* * * * *